United States Patent
Bezos

(10) Patent No.: US 9,826,022 B2
(45) Date of Patent: Nov. 21, 2017

(54) SOUND WAVE-BASED CONTENT SHARING

(71) Applicant: Amazon Technologies, Inc., Reno, NV (US)

(72) Inventor: Jeffrey P. Bezos, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/631,749

(22) Filed: Feb. 25, 2015

(65) Prior Publication Data

US 2015/0172366 A1 Jun. 18, 2015

Related U.S. Application Data

(63) Continuation of application No. 12/331,894, filed on Dec. 10, 2008, now Pat. No. 8,972,496.

(51) Int. Cl.
*H04L 29/08* (2006.01)
*H04L 12/66* (2006.01)
*H04W 4/20* (2009.01)

(52) U.S. Cl.
CPC .............. *H04L 67/06* (2013.01); *H04L 12/66* (2013.01); *H04W 4/206* (2013.01)

(58) Field of Classification Search
None
See application file for complete search history.

(56) References Cited

U.S. PATENT DOCUMENTS

| 3,609,752 | A | 9/1971 | Grosser |
| 3,910,322 | A | 10/1975 | Hardesty et al. |
| 7,796,978 | B2 | 9/2010 | Jones et al. |
| 7,869,792 | B1 * | 1/2011 | Zhou .................. H04M 1/67 455/411 |

(Continued)

FOREIGN PATENT DOCUMENTS

| CN | 1637728 | 7/2005 |
| EP | 1229469 | 8/2002 |

(Continued)

OTHER PUBLICATIONS

Notice of Last Preliminary Rejection dated Mar. 28, 2014; in corresponding Korean language patent application No. 10-2011-7015779.

(Continued)

*Primary Examiner* — Sulaiman Nooristany
(74) *Attorney, Agent, or Firm* — Polsinelli LLP

(57) ABSTRACT

Content can be shared between devices by transmitting an encoded signal that indicates, to each capable device within range, instructions for accessing the content. For example, a first device can emit an encoded audio signal that can be received by any capable device within audio range of the device. Any device receiving the signal can decode the information included in the signal and obtain a location to access the content from that information. Using such an approach, a first user can quickly and easily share content with several users at the same time without any of the receiving users having to determine or navigate to the content being shared. Further, using signals, such as audio signals, provides the ability for most existing devices to easily share content without significant hardware modification or additional expense.

14 Claims, 13 Drawing Sheets

(56) References Cited

U.S. PATENT DOCUMENTS

| | | | |
|---|---|---|---|
| 2002/0165793 A1* | 11/2002 | Brand ............... | G06Q 30/0601 705/26.1 |
| 2004/0064704 A1* | 4/2004 | Rahman ............. | G06F 17/3028 713/182 |
| 2004/0266338 A1 | 12/2004 | Rowitc | |
| 2005/0049732 A1* | 3/2005 | Kanevsky ............ | H04B 11/00 700/94 |
| 2005/0114672 A1 | 5/2005 | Duncan et al. | |
| 2005/0129068 A1 | 6/2005 | Ginzburg et al. | |
| 2005/0219068 A1 | 10/2005 | Jones et al. | |
| 2005/0273399 A1* | 12/2005 | Soma ..................... | G06F 21/10 707/758 |
| 2006/0136379 A1 | 6/2006 | Marino et al. | |
| 2007/0198414 A1 | 8/2007 | Derrenberger | |
| 2007/0226174 A1 | 9/2007 | Saito | |
| 2008/0244676 A1 | 10/2008 | DaCost | |
| 2008/0290987 A1 | 11/2008 | Li | |
| 2009/0006256 A1 | 1/2009 | Lazovsky et al. | |
| 2009/0111425 A1* | 4/2009 | Forbes .................. | G06Q 10/10 455/411 |
| 2009/0315687 A1 | 12/2009 | Kanevsky et al. | |

FOREIGN PATENT DOCUMENTS

| | | |
|---|---|---|
| EP | 1340320 | 10/2008 |
| JP | 09224005 | 8/1997 |
| JP | 11-119974 | 11/2000 |
| JP | 2003-008769 | 1/2003 |
| JP | 2004-280634 | 10/2004 |
| JP | 2007013274 | 1/2007 |
| JP | 2007-058405 | 3/2007 |
| JP | 2007-121626 | 5/2007 |
| JP | 2007164273 | 6/2007 |
| JP | 2008-065659 | 3/2008 |
| WO | 2005104000 | 11/2005 |

OTHER PUBLICATIONS

English translation of the Notice of Last Preliminary Rejection dated Mar. 28, 2014; in corresponding Korean language patent application No. 10-2011-7015779.
English abstract for JP2007164273; published on Jun. 28, 2007 and retrieved on Apr. 9, 2014.
Office Action dated Jan. 6, 2014, Canada Application 2,746,262, 2 pages.
Office Action dated Oct. 29, 2013, Korea Application 10-2011-7015779.
Office Action dated Apr. 9, 2013, Korea Application 10-2011-7015779.
Office Action dated Aug. 16, 2013, China Application 200980150046.9, 23 pages.
Office Action issued in corresponding Japanese Patent Application No. 2011-540886 dated Dec. 4, 2012, 5 pages.
Office Action issued in corresponding Chinese Patent Application No. 200980150046.9 dated Dec. 26, 2012, 19 pages.
Final Office Action issued in corresponding Japanese Patent Application No. 2011-540886 dated Mar. 26, 2013, 5 pages.
Office Action issued in corresponding Korean Patent Application No. 10-2011-7015779 dated Apr. 9, 2013, 4 pages.
Office Action issued in corresponding Canadian Patent Application No. 2,746,262 dated May 22, 2013, 3 pages.
Cornell, J., "Does This Headline Know You're Reading It?" *h+ Magazine*, Mar. 19, 2010, located at <http:I/hplusmagazine.comiarticles/ai/does-headline-know-you%/E2%80%99re-reading-it>, last accessed on Jun. 7, 2010, 4 pages.
International Search Report and Written Opinion for the corresponding International Patent Application PCT/US2009/067480, dated Mar. 16, 2010, 7 pages.
Extended European Search Report for the corresponding European Patent Application EP09832525.1, dated Feb. 15, 2017, 7 pages.

* cited by examiner

SOUND WAVE-BASED CONTENT SHARING

CROSS REFERENCE TO RELATED APPLICATION

This application is a continuation of, and accordingly claims the benefit of, allowed U.S. patent application Ser. No. 12/331,894, filed in the U.S. Patent and Trademark Office on Dec. 10, 2008, which is hereby incorporated herein by reference.

BACKGROUND

In today's environment, there is an ever-increasing number of portable devices such as notebook computers, personal data assistants (PDAs), smart phones, portable media players, portable gaming devices and electronic book reading devices (e-book readers). While many of these devices provide for at least one type of network connection, such as a hardwire Internet connection, a Wi-Fi connection, a 3G or other type of wireless connection, etc., there often is not an easy way to share information directly between these devices. For example, a first user viewing a document on a conventional e-book reader cannot easily share the document with a second user on a second e-book reader. In many cases, the first user would have to tell the second user about the document and the second user would have to navigate an interface on the second device to locate the document and then download the document to the device. In another example, a first user of a smart phone viewing a Web site of interest would have to tell a second user of another smart phone the URL (uniform resource locator) or other address of the site, which the second user would then have to manually enter in order to navigate to that site. In still another example, a first user of a portable media player locating a song that might be of interest to a second user must tell the second user about the song, and the second user must then navigate an interface, search for the song using a search query, or perform a similar action in order to locate and access the song with the second device. While other options exist on some devices, such as by the user typing in and sending an email message to a user of the second device, after obtaining and typing in the full email address, there is no simple way for a user to quickly and easily share such content with another user. The problem is exacerbated when there are multiple users in a room who desire to access the content concurrently.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure provide the ability for users to quickly and easily share content among multiple devices. For example, a member of a book club may have a book stored on an e-book reader that the member wants to share with other members of the club during their weekly meeting. By simply selecting to share that book with others in the room, the member's e-book reader generates a unique identifier for the content to be shared and emits an audible tone that includes the unique identifier. Other e-book readers within an audible distance (i.e., the e-book readers of the other book club members in attendance) receive the audible tone, utilize the included unique identifier to obtain the book that is to be shared, and automatically display that book to the users of those devices. In other embodiments, as described in further detail below, users may specify whether to display a specific page within the shared content, whether to include annotations, how to share the content, etc.

In addition to sharing books, as further described below, the content may include various other types of documents, meeting schedules, contact information, Web pages, or any other type of information that a user may desire to share with others or otherwise transfer to other devices. For example, assume at the end of the book club meeting the members decide to schedule their next meeting. Instead of each member having to update their own calendar with a meeting time and location and obtain the book to be read for that meeting, one person from the book club may utilize that person's e-book reader and select to share the meeting time, location and book information. The e-book reader will generate a unique identifier for the content to be shared (the meeting time, location and book) and emit an audible tone that includes the unique identifier. The other e-book readers within an audible distance will receive the audible tone and utilize the included information to obtain the meeting time, location and the book that will be discussed at the meeting by the group.

Figure 1A:
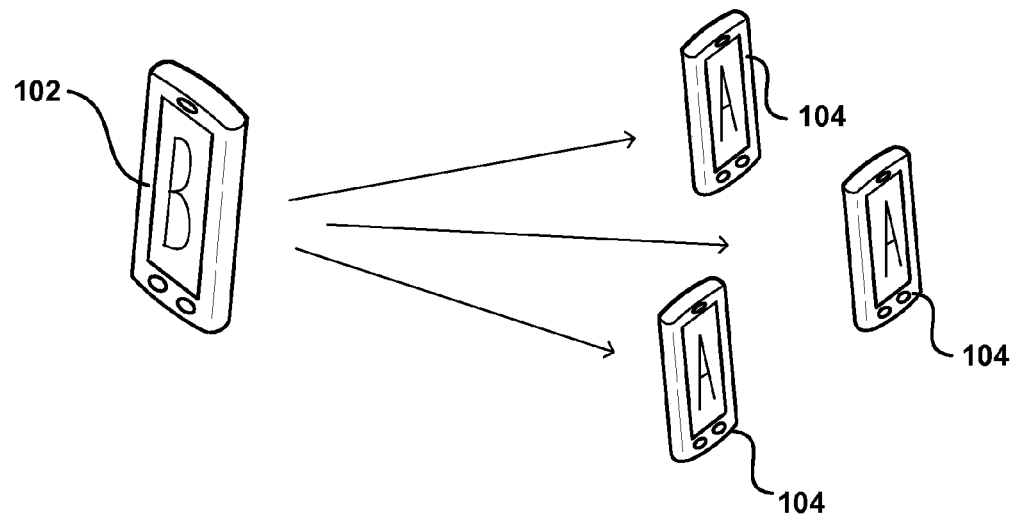
FIG. 1(a) illustrates a set of devices that can advantageously utilize various aspects in accordance with one embodiment.

FIG. 1(a) provides a more detailed illustration of sharing content among multiple devices in a quick and convenient manner in accordance with one embodiment. For example, a number of users might attend a meeting involving a user having a first device 102. During the meeting, the user might access a Web site on the first device 102 that the user wishes to discuss. In conventional approaches, the user could project the Web site on a screen viewable by all the attendees. However, such an approach requires the first device to be connected to the projector and properly configured, and even then all users in the room are limited to seeing only the page or portion currently being displayed on the screen. Still further, if others are attending the meeting via telephone they would not receive the benefit of being able to view the projected content. Using one of the approaches in accordance with the various embodiments, the user can simply select an option on the first device, referred to herein as a sharing device, to "share" the content with the others attending the meeting. This can involve transmitting a signal that can be detected by other devices 104 of users who are attending the meeting; either in the room or via telephone, or another audible connection.

For example, the sharing device 102 can emit an audio signal that can be detected by any devices 104, referred to herein as receiving devices, within an audible range, provided that those devices 104 have a microphone or similar audio input capability. If every meeting attendee has such a receiving device, then each of the receiving devices can detect the audio signal and decode the signal to determine the information in the signal. As discussed below, there are a number of ways to encode and decode information using such a signal. In this case, the signal can include a "notification" signal that indicates to each receiving device 104 that it should prepare to receive an information signal. A notification signal can be used to place receiving devices 104 in a ready or active state such that those devices can receive the shared content. This can include bringing receiving devices out of a low power state (e.g., sleep or hibernation), activating components necessary to receive and process signals, or both. The sharing device 102 then can transmit, as part of the same signal or as a subsequent signal, an information signal that includes information for accessing the content to be shared. Utilizing an information signal provides the ability for devices to share content without actually having to transmit the content from the sharing device 102 to the receiving device(s). The information signal may simply provide an identification or pointer to a location of the content such that a receiving device can access or obtain the content from a source other than the sharing device. In this example, the information signal can include an encoded version of a URL to be used to access the Web site. Once each receiving device receives and decodes the signal, a browser on each device can automatically navigate to the URL or other access identifier and display the Web site to the user. Using such an approach, each user can quickly view the Web site and can have the ability to separately navigate the site as desired. The above-described process quickly communicates the information to receiving devices detecting the signal, avoids issues related to incorrectly typing the site address, and limits the sharing of the information as devices unable to detect the signal do not gain access to the address.

Figure 1B:
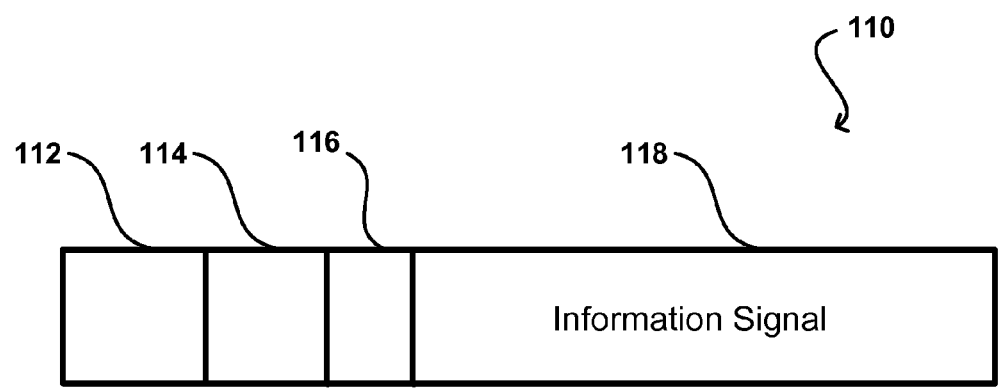
FIG. 1(b) illustrates an example set of signals for transmitting information regarding content to be shared in accordance with one embodiment.

FIG. 1(b) illustrates an example set of signals, or portions of a common signal, for transmitting information regarding content to be shared in accordance with one embodiment. The set of signals 110 may be transmitted using any appropriate signal, such as an audio signal, or other sound based signal. In one embodiment, the set of signals 110 includes three portions: a notification signal 112, indicating to each capable device within range that an information signal 118 is forthcoming; an information signal 118, indicating a location of the content or a unique identifier for the content; and an error correction signal 116 or other such mechanism allowing the receiving device(s) to ensure that the information signal 118 was properly received. The set of signals 110 may be transmitted as one unit containing all parts or may be transmitted separately, each signal containing one or more parts. Additionally, the parts may be transmitted in any ordered provided the notification signal 112 is the initial sequence of the transmission. It should be understood that additional, fewer, or other signals or portions may be used in accordance with other embodiments to share content as discussed herein.

The notification signal 112 is used to notify receiving devices that information to be shared is forthcoming. The notification signal 112 may be used to transition receiving devices into a ready state such that the subsequently transmitted signals can be received and processed. The notification signal 112 may be a preset signal for which receiving devices periodically listen, even when in a low power state, to determine whether the device needs to receive an information signal 118. In some embodiments, the notification signal may also include an identification of the sharing device, or an identification of which receiving devices should pay attention to the notification signal 112 and/or the following information signal 118. In some embodiments, other receiving devices may be configured to only respond to notification signals from particular sharing devices, or including specific notification codes. Providing a notification signal 112 enables receiving devices to transition to low power states when there is no information to receive, such as by removing power from the display, memory etc., thereby saving battery life while at the same time being able to receive information signals that are to be shared.

The error correction signal 116 may be any type of verification signal that is used to ensure that the information signal 118 was accurately and completely received. For example, the error correction signal 116 may be a checksum value of the information signal 118. Receiving devices may generate a corresponding checksum value for the received information signal 118 and verify the accuracy of the information signal 118 by comparing the received error correction signal 116 with the generated checksum value. In the event the signal was not properly received, the receiving device may transmit a resend message that the information signal 118 needs to be retransmitted. Additionally, or as an alternative to including an error correction signal 116, the information signal 118, and optionally the error correction signal 116, may be automatically transmitted a fixed number of times to increase the likelihood that all devices that are intended to receive the information signal 118 receive the signal without error.

In some embodiments, a repeater signal (not shown) may also be included in the set of signals 110. A repeater signal may be transmitted as a separate signal in the sequence of transmissions following transmission of the notification signal 112 or may be included as part of the transmission of the error correction signal 116, the information signal 118 or in combination with any other signal that is included in the transmission. A repeater signal is used to notify receiving devices that they are to transmit, or repeat, the notification signal 112 and the information signal 118 or possibly the entire set of signals 110. The repeater signal may simply be a single bit that is provided as part of the information signal 118 to notify whether transmission is to be performed. In such an embodiment, once a receiving device receives the information signal 118 with the repeater signal set, the receiving device stores the information signal 118, confirms its accuracy based on the error correction signal 116, internally notes that it has received the information signal 118 and transmits the signal(s). This transmission may include transmission of the entire set of signals 110 or only a portion thereof. If the same device receives the same signal a second time (e.g., from another device that is transmitting the signal), that device identifies that it has already received and transmitted that signal. As a result, the subsequently received signal is discarded and not transmitted by the receiving device. Providing a repeater signal as part of the set of signals 110, provides the ability for an information signal 118 to be shared with a very large audience by propagating the signal among many devices. Additionally, internally noting on each receiving device that it has received and transmitted the signal ensures that the signal is not continuously transmitted.

The information signal 118 may be any type of signal or data that can be used to identify or obtain the content to be shared. For example, the information signal 118 may include a URL that is used to obtain a Web page that is to be shared, one or more alphanumeric characters or identifiers, or any other type of information that can be used to access the content to be shared. In the example of the information signal including a URL, the receiving devices may use the URL to directly obtain the Web page. In alternative embodiments, as described in detail below, the information signal 118 may include a unique identifier, such as a randomly generated number, that may be used by the receiving devices to obtain the content from a central location. The information signal 118 may also include an identifier of the sharing device. The information signal 118 may be a short access signal, such as a unique identifier, that is then used to access a common network resource known to the sharing device and the receiving devices. Utilizing a short signal reduces likelihood of an error occurring in the transmission and also provides the ability to control access by reducing the range with which the signal must be broadcast.

Upon receiving the information signal 118, each receiving device is able to decode the information signal 118 and use the information signal to access or obtain the shared content. The information signal 118 may be a specific URL, a reference to a document, an alphanumeric identifier, or any other relatively unique signal that can be transmitted to a server system to determine the content associated with that signal. While any appropriate technique may be used, in various embodiments, a sharing device can "push" content to receiving devices by emitting a signal that can be received by every other device such that the receiving device can access the content directly without the user having to enter or determine the location of the content.

In addition to the notification signal 112, error correction signal 116, and information signal 118, the set of signals 110 that is transmitted may optionally include an authorization signal 114. The authorization signal 114 may be a unique identifier that is initially provided to receiving devices independent of the information signal 118 and used to confirm that the receiving device is authorized to receive the shared content. Similar to the other signals that are transmitted as part of the set of signals 110, the authorization signal 114 may be transmitted independent of the other signals or combined with one of the other signals that are transmitted. Additionally, the authorization signal 114 may be transmitted at any point in the sequence of transmissions following transmission of the notification signal 112.

An authorization signal 114 may be used to provide an added level of security to ensure that only intended recipients receive the information to be shared. For example, an authorization signal 114 may be provided and stored on a receiving device when a user signs up for a conference. When a speaker at the conference elects to share information, the authorization signal is included in the transmitted set of signals 110 and the receiving devices may be required to have a matching authorization signal to obtain the content. Alternatively, the set of signals 110 may simply indicate that an authorization signal is required for the receiving device to obtain the content. In this embodiment, when the receiving device receives the information signal and attempts to obtain the content to be shared, it is required to also provide an authorization signal or other authenticating information. Any type of authorization technique may be used with the embodiments described herein and these are only examples.

In addition to an authorization signal 114, or as an alternative thereto, the information signal 118 may be encrypted using any type of encryption technique to further increase security and prohibit unauthorized access to shared content. In addition to encryption, the type of transmission used can also be selected based upon a current environment. For example, an audio signal has an advantage that it is not substantially directional, and can be heard by any user/device in a room or within a certain radius. In certain situations, however, this would allow any unintended user within that radius to also intercept the communication, such as a user just outside a conference room that is still able to receive the audio signal. Thus, a type of security or encoding as discussed above might be used for sensitive information.

In another example, an infrared or similar light-based signal can be used to transmit to other devices. Such an approach has an advantage that a user outside a room generally will not be able to receive the signal. However, use of infrared or similar light-based signal typically requires the devices to be oriented towards each other without obstacles in-between, which can be difficult in large meeting rooms with several attendees. In such situations, there can be repeaters or other devices in the meeting room that are able to emit the signals from different directions, such as from the ceiling or walls, in order to quickly reach all attendees.

In another example, various types of wireless communication can be used. While some types of wireless transmission (e.g., radio frequency transmissions) may provide advantages relating to security, they can in some instances require the devices to be more complex and thus more expensive. Accordingly, a more basic approach, such as an audio signal, may be preferred in some situations as many devices already have at least one speaker and a microphone, or can be so modified at relatively little expense. Additionally, utilizing audio communication allows users attending a meeting by speakerphone, teleconference, or video conference, for example, to receive the audio signal and access the desired content. For example, if users in Tokyo are participating, via speakerphone, in a meeting being held in New York, when the presenter's device in New York transmits the set of signals 110, the transmission will be relayed from New York to Tokyo, via a telecommunications network and output via a speakerphone or other such device, so that the devices of meeting attendees in Tokyo can quickly detect the signal and access the desired content. Additionally, non-meeting attendees, and those without devices, that hear the signal would not understand the signal and therefore not have access to the content.

FIGS. 2(*a*)-2(*b*) illustrate an example of sharing information between devices in accordance with one embodiment. Continuing with the meeting example, an attendee of the meeting might want to discuss a document, such as an annual report. If the attendee is viewing the document on a sharing device 202, the attendee can simply select to share the document. In some instances, the user of the sharing device 202, in this example the meeting attendee, might not have opened the document, but might view a shortcut or link to the document, or view a listing of the document in a set of search results, and can perform an action such as "right clicking" or otherwise bringing up an option to share the document without having to open the document first. This can be desirable for documents that might take a long time to download for certain devices or connectivity types, such that it can be shared with other users and downloaded concurrently while the first user is opening the document.

In response to a selection to share a document, the sharing device 202 generates an information signal and sharing information. The information signal and the sharing information may be generated in parallel as the signals contain similar items of information and are related. For example, both the information signal and the sharing information include information that can be used to identify or obtain the shared content. As described herein, information for accessing content is included in the information signal so that a receiving device 204 that receives the information signal can provide that information to a common network resource 208 and obtain or otherwise access the content to be shared. Likewise, as described below, the information for accessing the content is included in the sharing information provided to the common network resource 208, such that the common network resource 208 will be able to identify and share the content when requested by receiving devices 204.

As described above, the information signal includes information that can be used to identify or obtain the shared content; it does not contain the content. In this example, the information signal includes a unique alphanumeric identifier, generated by the sharing device 202, in response to a request to share the content. The information signal may also include other signals, such as an error correction signal, an identification of a common network resource through which the shared content may be obtained, an authorization signal, a repeater signal, etc. In some embodiments both the sharing device 202 and the receiving device 204 may, independent of the information signal, have information necessary for locating and accessing a common network resource 208. For example, the sharing device 202 and the receiving device 208 may both include a default common network resource 208 location that is used to provide access to shared content or to access content that is shared.

The sharing information, as described in more detail below, includes the information for accessing the content to be shared (e.g., the unique alphanumeric identifier). The sharing information also includes an identification of the content to be shared, or in some embodiments, the content itself. In one embodiment, the information for accessing the content and the identification of the content may be the same and thus only included once in the sharing information. For example, the information for accessing the content may be a URL that identifies both information for accessing the content and the information. As such, the sharing information will only include one instance of the URL.

In addition to including the information for accessing the content and the identification of the content, the sharing information may also include an identification of the sharing device 202 and other requirements regarding the information to be shared. Such other requirements include, but are not limited to, expiration time for the shared content, an indication that information regarding receiving devices 204 that access the shared content be provided back to the sharing device 202, restrictions on what devices may access the shared content, an authorization or encryption code for the shared content, or a requirement that the content is only to be shared in parts (e.g., on a page-by-page basis).

After generation of the information signal and the sharing information, the sharing device 202 transmits the sharing information and the information signal. These transmissions are distinct and can occur in parallel or serially. In this example, the information signal is transmitted audibly such that devices of other users attending the meeting can receive the information signal. The sharing information is transmitted separately to the common network resource 208. The sharing information may be transmitted using any transmission medium, as discussed elsewhere herein. For example, the sharing information may be transmitted via wired or wireless communication through a network 206, such as the Internet, to the common network resource 208.

The common network resource 208, upon receiving the sharing information, confirms that it either has, or has access to, the content to be shared. The common network resource 208 also generates an association between the information for accessing the content (e.g., the unique alphanumeric identifier) and the content. In some embodiments, if the common network resource 208 does not have access to the shared content, or if it is not included in the sharing information, it may obtain the content from the sharing device 202.

The association generated by the common network resource 208 may also identify the sharing device 202 and include any other requirements or information that was included in the sharing information. The association information is used so that when the common network resource 208 receives a request to access shared content it will be able to identify the shared content that is to be provided in response. In addition, the association information may also be used to identify any requirements regarding shared content before the content is provided back to a receiving device 204.

The receiving device 204, upon receiving an audibly transmitted information signal from the sharing device 202, transmits to the common network resource 208 a request to obtain the shared content identified in the information signal. The request to access shared content may include, among other items of information, the information for accessing the content obtained from the audibly transmitted information signal, an identification of the receiving device 204 and an identification of a user of the receiving device 204. The request to access shared content may be transmitted using any typical form of transmission. For example, the request to access shared content may be transmitted via wired or wireless communication via network 206 to the common network resource 208.

Figure 2A:
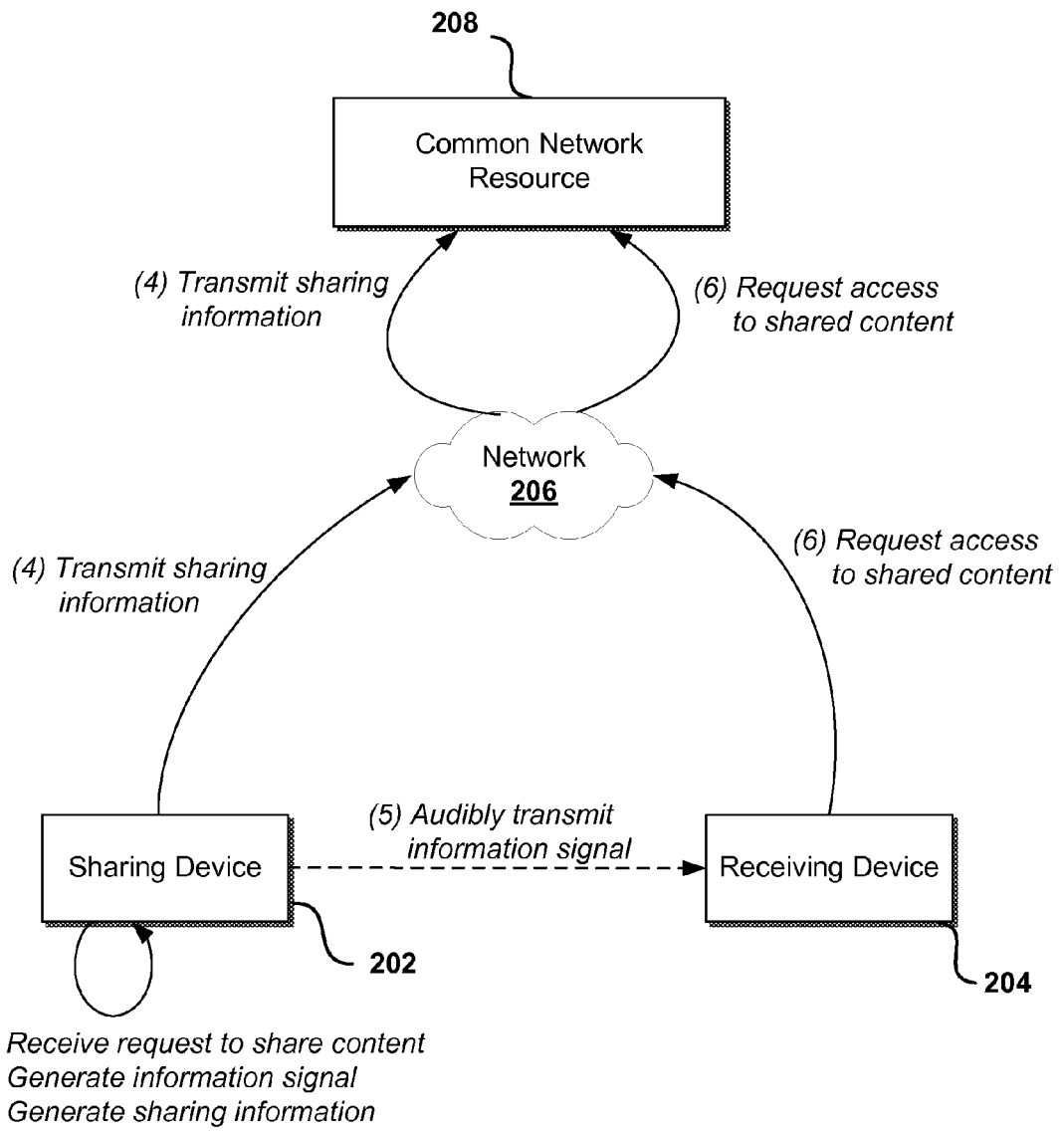
FIGS. 2(a)-2(b) illustrate an example of sharing content among devices in accordance with one embodiment.
Figure 2B:
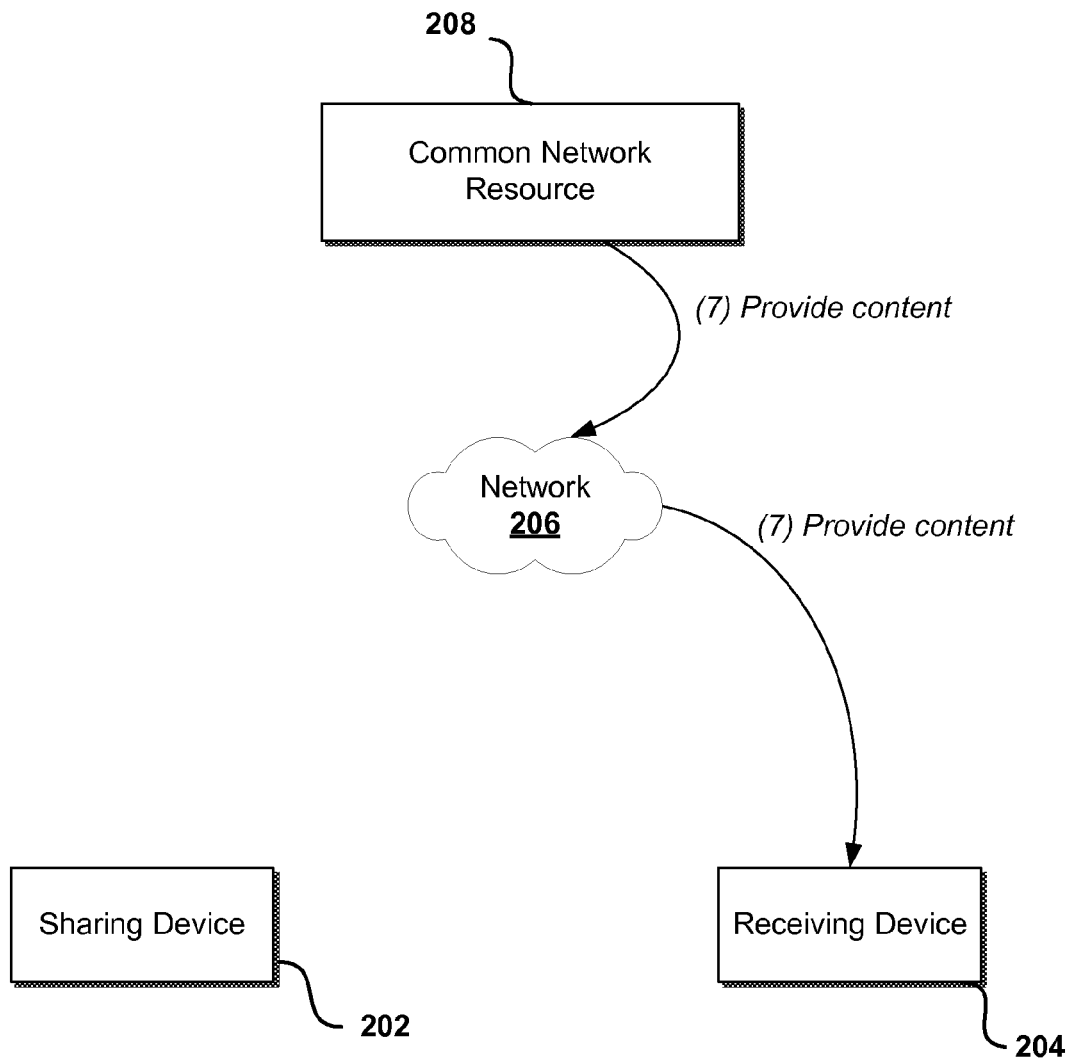

Referring now to FIG. 2(b), the common network resource 208, upon receiving a request from the receiving device 204 to access shared content, compares the information included in the request with the association information to identify the content that is to be shared with the receiving device 204. Continuing with the meeting example, the unique alphanumeric code included in the request to access shared content is located in the association information and the corresponding content to be shared is identified. Upon identifying the content to be shared with the receiving device 204, the common network resource 208 provides the content to the receiving device 204. Providing shared content to the receiving device is accomplished in one embodiment by transmitting a copy of the content to the receiving device or providing the receiving device 204 with a network location or other reference identifying a source from which the receiving device can directly obtain or access the shared content. Once the shared content is received by the receiving device 204, the shared content may be automatically presented to the user of the receiving device 204. In alternative embodiments, other functions, such as storing the content, may be performed with respect to the shared content that is received by the receiving device 204.

The above process described in FIGS. 2(a)-2(b) is one example of how content can be conveniently shared between a sharing device 202 and at least one receiving device 204 without the receiving device(s) 204 obtaining the content directly from the sharing device 202. Utilizing the embodiments described herein provides the ability to share content with potentially a large number of devices without either the user of the sharing device having to specifically identify each receiving device, or users of the receiving devices having to manually obtain the content. In addition, once the receiving device 204 has obtained the shared content from the common network resource 208, a user of the sharing device 202, via the common network resource 208, can send control signals to the receiving device 204 directing the receiving device 204 to display specific portions of the shared content (e.g., a specific page), highlight, annotate or otherwise modify portions of the shared content, or direct the receiving device to other content to be shared.

In some embodiments, a device can be configured to automatically navigate to specified content upon receiving an information signal. In such embodiments, a user might first have to activate a specific listening mode on the receiving device. This embodiment is particularly useful when a meeting is being conducted with a primary speaker (s) that will be sharing content with others. Attendees placing their devices into a listening mode will automatically receive the information signal, access the shared content, and have the shared content displayed on their respective devices. In addition, subsequent control signals may be transmitted during the presentation to provide further interaction with the content. Subsequent control signals can be delivered audibly to sharing devices or through other means, as described below. For example, if the speaker has shared a presentation, each time the presenter transitions to a new slide or page within the presentation, a control signal may be sent to receiving devices to likewise change the displayed content to the new page. In one embodiment, the control signal may be sent audibly in a manner similar to that of transmitting an information signal 118. Alternatively, in a system with a common network resource, such as described below with respect to FIGS. 2(*a*)-2(*b*) and FIG. 6(*c*), once a receiving device has requested to access content shared by a sharing device, the common network resource generates and maintains an association between the sharing device and the receiving device. Once that association is made, control signals can be sent to receiving devices from a sharing device via the common network resource without further direct communication between the sharing device and the receiving devices. For example, if a speaker at a meeting is sharing a presentation, each time the speaker transitions to a new page or slide in the presentation, the speaker's device, the sharing device, may generate and transmit a control signal to the common network resource. The common network resource, upon receipt of such a control signal, may automatically transmit that control signal to all receiving devices that have accessed the shared content. In turn, the receiving devices may automatically transition to the new page/slide in response to receiving the control signal. In alternative embodiments, a user at a receiving device might always have to confirm transition to new pages of the content before the device proceeds. Still further, at an initial point, a user of a receiving device may elect to always confirm a request to access shared content before the receiving device navigates to the content. Such a confirmation prevents others from pushing undesired content to a device.

Figure 3:
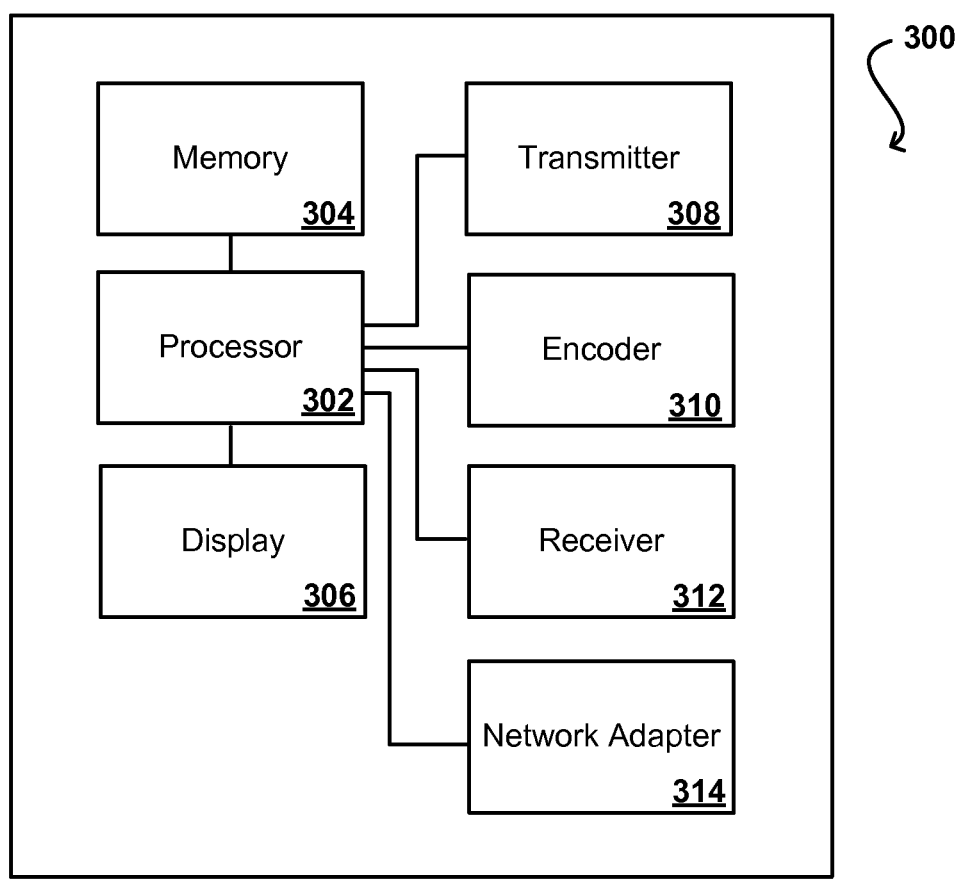
FIG. 3 illustrates components of an example device that can be used in accordance with one embodiment.

FIG. 3 illustrates components of a device 300, a receiving device or sharing device, that can be used in accordance with various embodiments. It should be understood that these are merely examples for discussion, and that a number of additional components, configurations, assemblies, and combinations are possible as known in the art. As shown, each device generally will include at least one processor 302 able to execute instructions stored in a memory 304 and generate information on a display component 306. In embodiments such as where a user is sharing songs or other audio information between portable audio players, a display may not be required. Each device can include a receiver 312 for receiving information signals and may also include a transmitter 308 for transmitting information signals. In some devices, a single component or transceiver might perform both functions. As discussed, the types of signals that can be transmitted can include sound or light-based signals, among various other signals and signal types, such that the receiver can include a component such as a microphone or infrared port, and the transmitter can include a speaker or infrared transmitter. The device can also include an encoder 310, which can encode the content information, and any other appropriate information, to be transmitted as an information signal. The encoder 310, or a separate decoder component, can also be used to decode the information signal received from another device. In some embodiments, the encoder 310 is embodied by software stored in the memory 304 that is executed by the processor. The device can also include a network adapter 314 that allows the device to access the content once the information signal is obtained. As discussed elsewhere herein, this can include any appropriate network adapter for connecting to any appropriate network, such as to establish an Internet, intranet, or wireless connection. For a device having content to share, the network adapter can also be used to upload the content to a specific location if the content is stored locally on the device.

Figure 4:
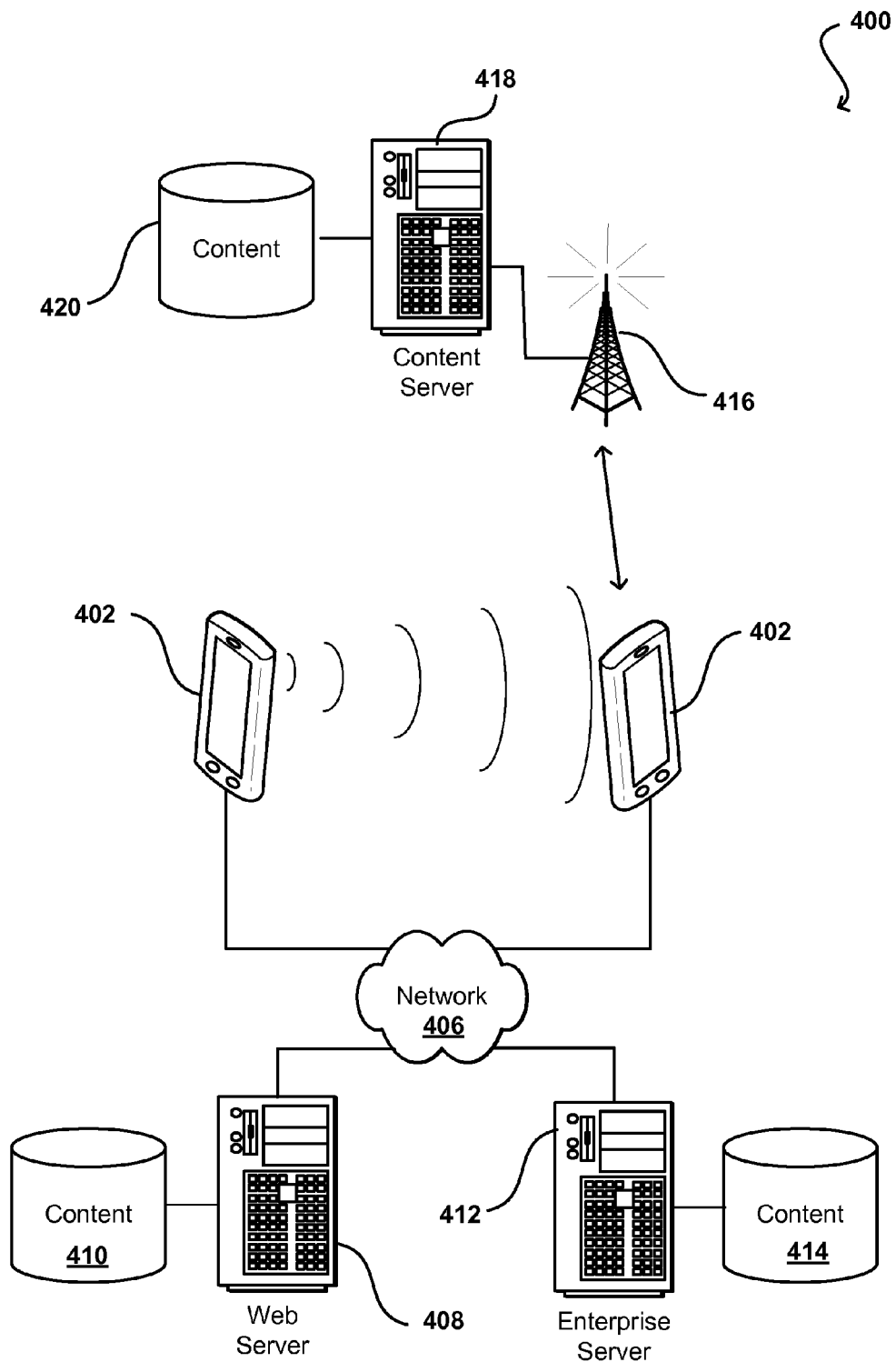
FIG. 4 illustrates an example of a network configuration that can be used in accordance with one embodiment.

FIG. 4 illustrates an example of a configuration 400 wherein devices 402 can share content in accordance with various embodiments. In this example, one of the devices, a sharing device, transmits an information signal to the other device, a receiving device, as discussed above. As identified above, the information signal may be an audio signal or any other type of sound based signal. In addition, the information signal may be, infrared signal, Wi-Fi transmission, Bluetooth® transmission (Bluetooth® is a registered trademark of Bluetooth SIG, Inc. of Bellevue, Wash.) or any other type of wireless transmission.

The receiving device is able to decode the signal and access the information to be shared. For example, if the information signal is a URL and the device has a connection to a network 406 as described elsewhere herein, then the device can access content from the Internet by sending a request for the content to a Web server 408, which is able to locate the content based on a URL or similar locator, and pull the content from a content repository 410 to serve to the device. If the content is a document or other object stored on a company network, or other common network resource, the device can send a request through the network 406 to an enterprise server 412 or similar component to obtain content from an Enterprise database 414 or similar data store. For devices such as an e-book reader, the device might not have a conventional network connection but might only have limited capability over a wireless network. In such a case, the device can send a wireless request that can be received by a wireless receiver 416, tower, base station, or other such component, which can locate the content from a data store 420 using a content server 418 and then transmit the content back to the device, using the same or a different transmitter, base station, etc. In a similar manner, a wireless network may also be used to access a Web server 408 to obtain content from data store 410 or to access an Enterprise server 412, or other common network resource, to obtain content from the data store 414. As should be understood, in an example where multiple devices are receiving the information signal, each device might have different capabilities such that each device might use any of these or other approaches to obtain the content.

Figure 5A:
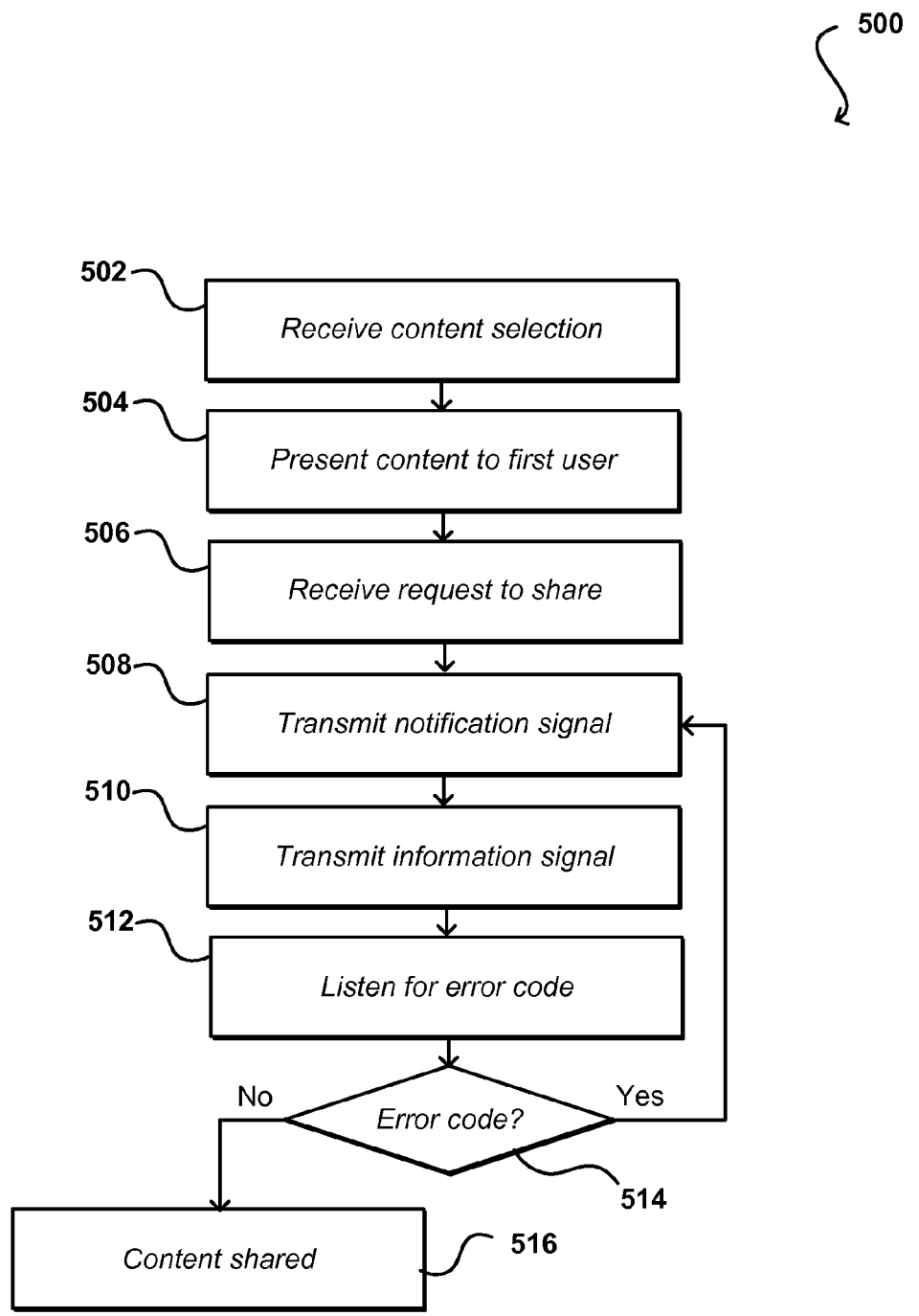
FIGS. 5(a)-5(b) illustrate examples of a method for sharing content that can be used in accordance with one embodiment.
Figure 5B:
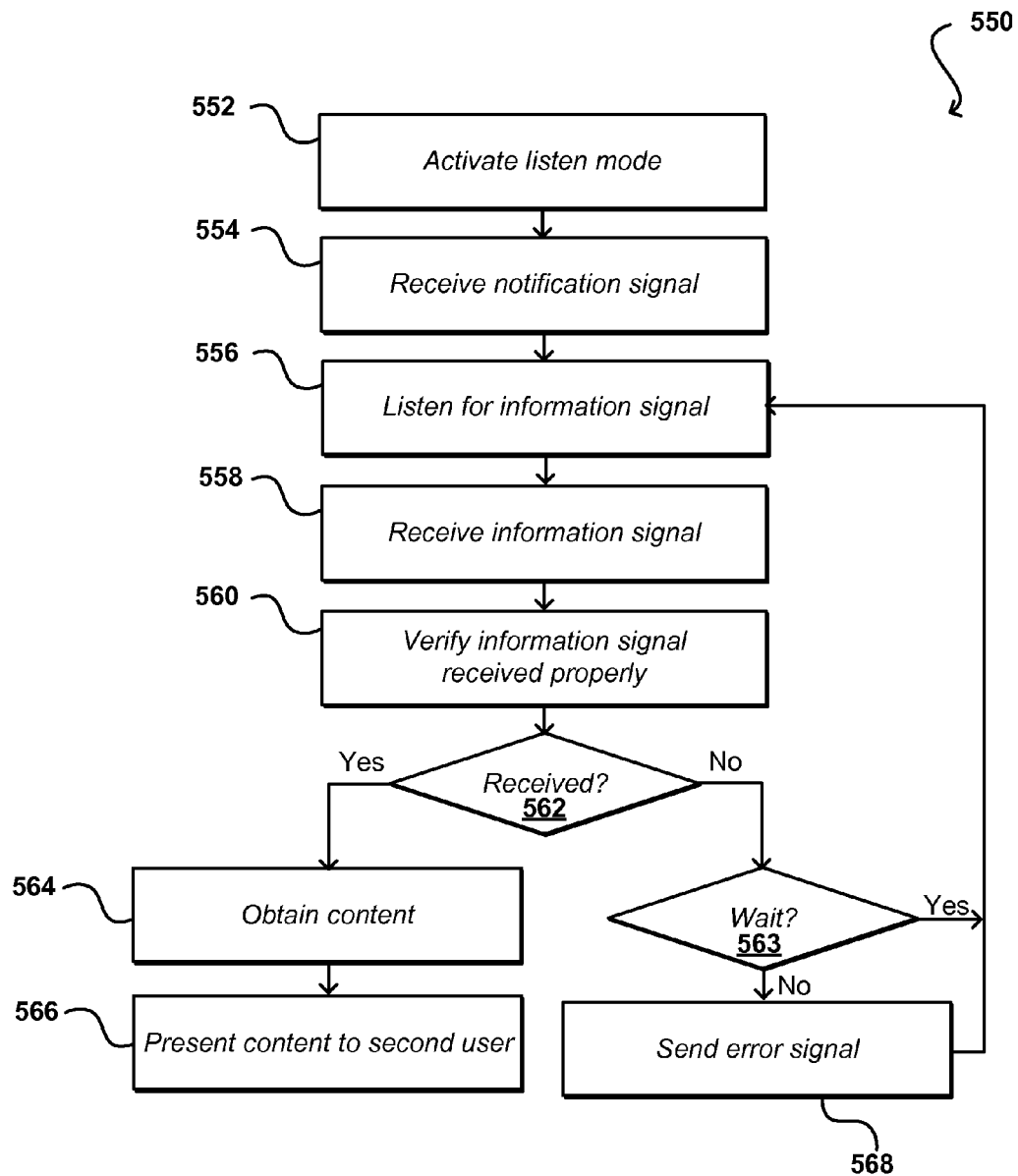

FIGS. 5(a)-5(b) illustrate example methods for sharing content that can be used in accordance with various embodiments. FIG. 5(a) illustrates a process 500 by which a first user having a first device, a sharing device, can share content with a second user having a second device, a receiving device. It should be understood, however, that such an approach can also allow a single user to share information between different devices, such as to transfer a file between devices. In this example, the sharing device receives a selection of content from the first user 502. As discussed, this can involve the first user opening a document, browsing a Web page, selecting a search result, or otherwise designating specific content. The sharing device typically will present the content to the first user 504, such as by rendering the page or document for display, playing the audio or video file, or performing a similar action. The sharing device then can receive a request from the first user to share the content 506. As discussed, this can involve the first user selecting an option or menu item on an interface of the sharing device to share the content with another user. For an audio device without a display screen, for example, this can involve pushing a button or selecting another user-selectable element when a desired song or audio file is to be shared.

In this example, the sharing device begins transmission of an information signal by transmitting a notification signal to indicate to other capable devices within range that the sharing device is about to transmit an information signal 508. Transmission of a notification signal can include transmitting a specific tone or code, which when detected by a capable receiving device puts that device in ready state such that it can attempt to receive the information signal and determine whether it received the information signal without error. In some embodiments, the sharing device creates a unique identifier, such as a long random number, and then emits an encoded signal that includes the unique identifier. After a predetermined delay following the notification signal, the sharing device transmits the information signal 510. As discussed, in some embodiments the sharing device can encode and/or encrypt the information signal before transmission. As part of the transmission sequence, or as part of the information signal, an error correction signal may be transmitted such that a receiving device can quickly determine whether the information was accurately received. In a similar manner, an authorization signal may also be transmitted thereby providing additional security to ensure that only authorized recipients receive the shared content. In some embodiments, the information signal can be repeated a number of times, such as for a total of three transmissions. Such an approach can help to ensure that the receiving devices are able to receive the information signal without error. For example, if an audio signal is only transmitted once, any noise, such as someone coughing or moving a chair, could prevent the signal from being received properly. In addition to the sharing device transmitting the signal, the information signal may include a repeater signal identifying to receiving devices that they should transmit the information signal; thereby increasing the likelihood that all intended devices are able to receive the information signal without error.

In some embodiments, the receiving devices are able to transmit an error tone or signal if the information signal is not properly received. A receiving device can know that the information signal was not properly received through any of a number of approaches, such as the error code not matching the information, an incomplete amount of data being received, or the device being unable to locate content using the information obtained from the received information signal. The sharing device can listen for a period of time to determine whether an error signal is received 512 from one of the receiving devices. While each receiving device could also or alternatively emit a tone or signal that the information signal was received successfully, in many situations the sharing device will not know how many receiving devices were supposed to receive the information. Thus, the sharing device would not know whether all receiving devices successfully received the information based only on devices that successfully received the information transmitting a confirmation signal. If an error signal is received 514, then the sharing device can again transmit the information signal. If no error signals are received after a transmission, the sharing device can assume that all appropriate devices received the information signal and can end the transmission process 516.

FIG. 5(b) shows a corresponding process 550 that can be used with a second or receiving device in accordance with various embodiments. In this process, a user of the receiving device can activate a listen mode 552, such as by selecting an option through an interface or moving a switch on the device. In an embodiment where encryption, security codes or authorization codes are used, the user might also have to enter, select, or otherwise activate a code such that the receiving device only listens for specific information. The receiving device then can passively wait to receive a notification signal from another device and optionally confirm that it is an intended signal for that device (e.g., via the encryption, security code or authorization code). When the receiving device receives such a notification signal 554 and optionally confirms encryption, security code or authorization code, the receiving device can actively listen for a corresponding information signal 556. When listening for an information signal, the receiving device can analyze the sound input to attempt to determine the appropriate information signal, along with any encoding, error correction, or other information. After receiving the information signal 558, the receiving device can verify whether the information was properly received 560, such as by decoding the information signal and applying the error correction code. If the information was not properly received 562, the receiving device can either wait for a retransmission of the information signal 563 or emit an error signal 568, thereby requesting that the information signal be retransmitted. The device may determine to await retransmission 563 for a predetermined count or time-period. For example, if the receiving device has received less than three attempted transmissions of the information signal it may wait for a predetermined time-period (e.g., 10 seconds) before sending an error signal 568. However, if the receiving device has already received three attempted retransmissions of the information signal, it may automatically send an error signal 568 again requesting the information signal. In some embodiments, a receiving device emitting an error signal can cause a device other than the originally transmitting device to retransmit the information signal, such that receiving devices at the edge of the signal range of the initial sharing device can obtain the information from devices that are within range. Once the information is properly received and decoded, the receiving device can access or obtain the content 564 from the identified location and present the content to the second user via the receiving device 566.

Figure 6A:
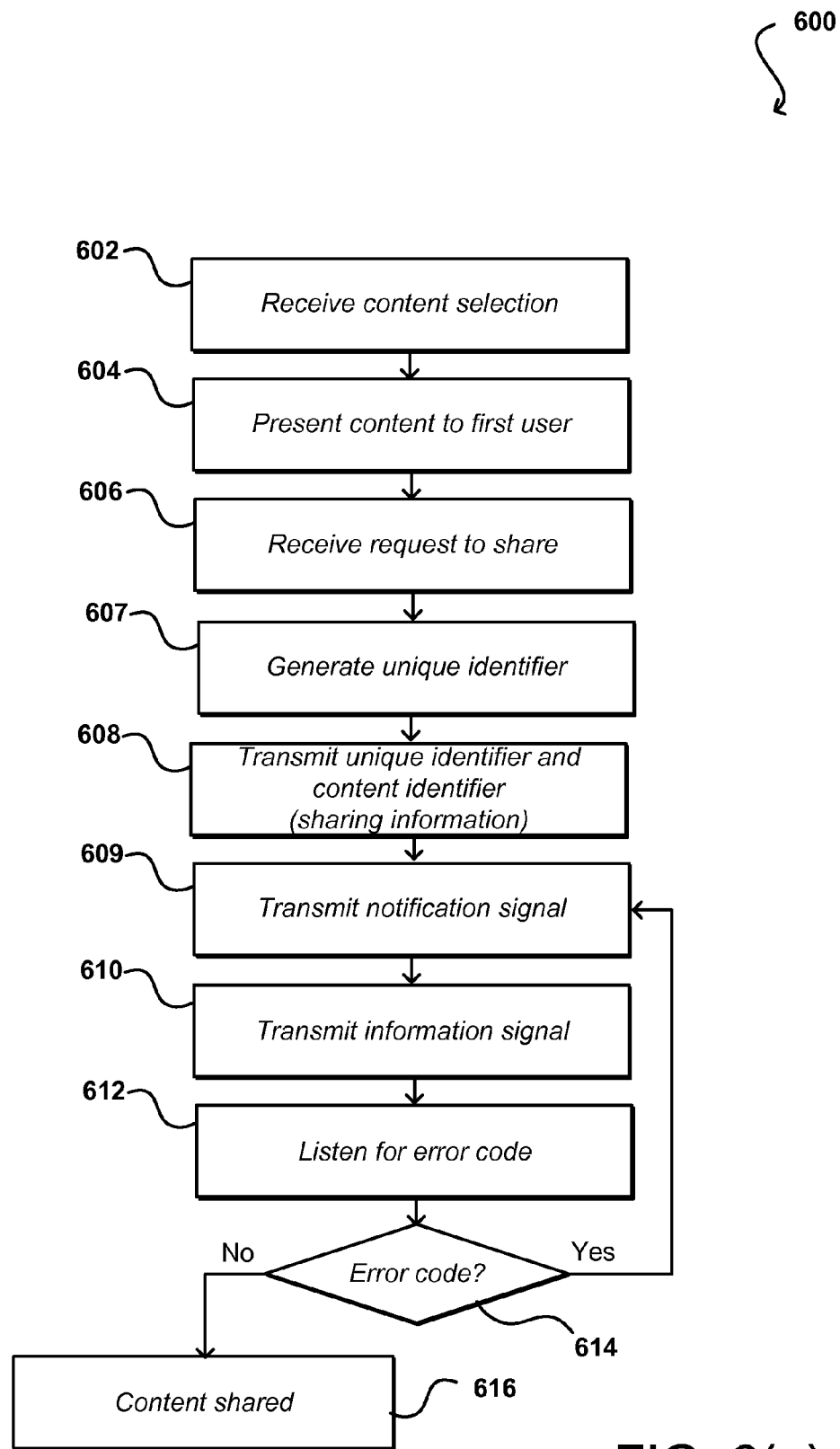
FIGS. 6(a)-6(c) illustrate another example of a method for sharing content that can be used in accordance with one embodiment.
Figure 6B:
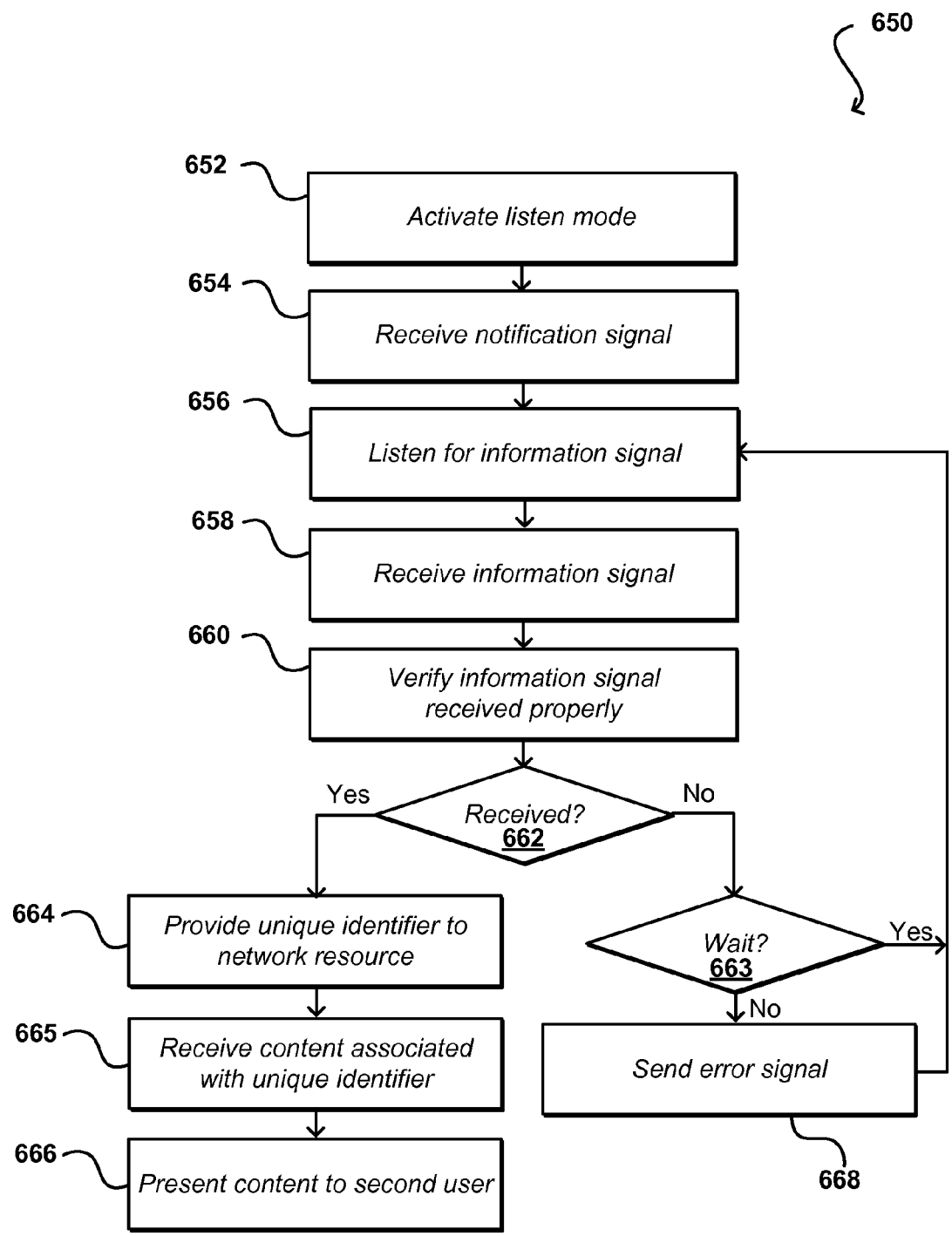
Figure 6C:
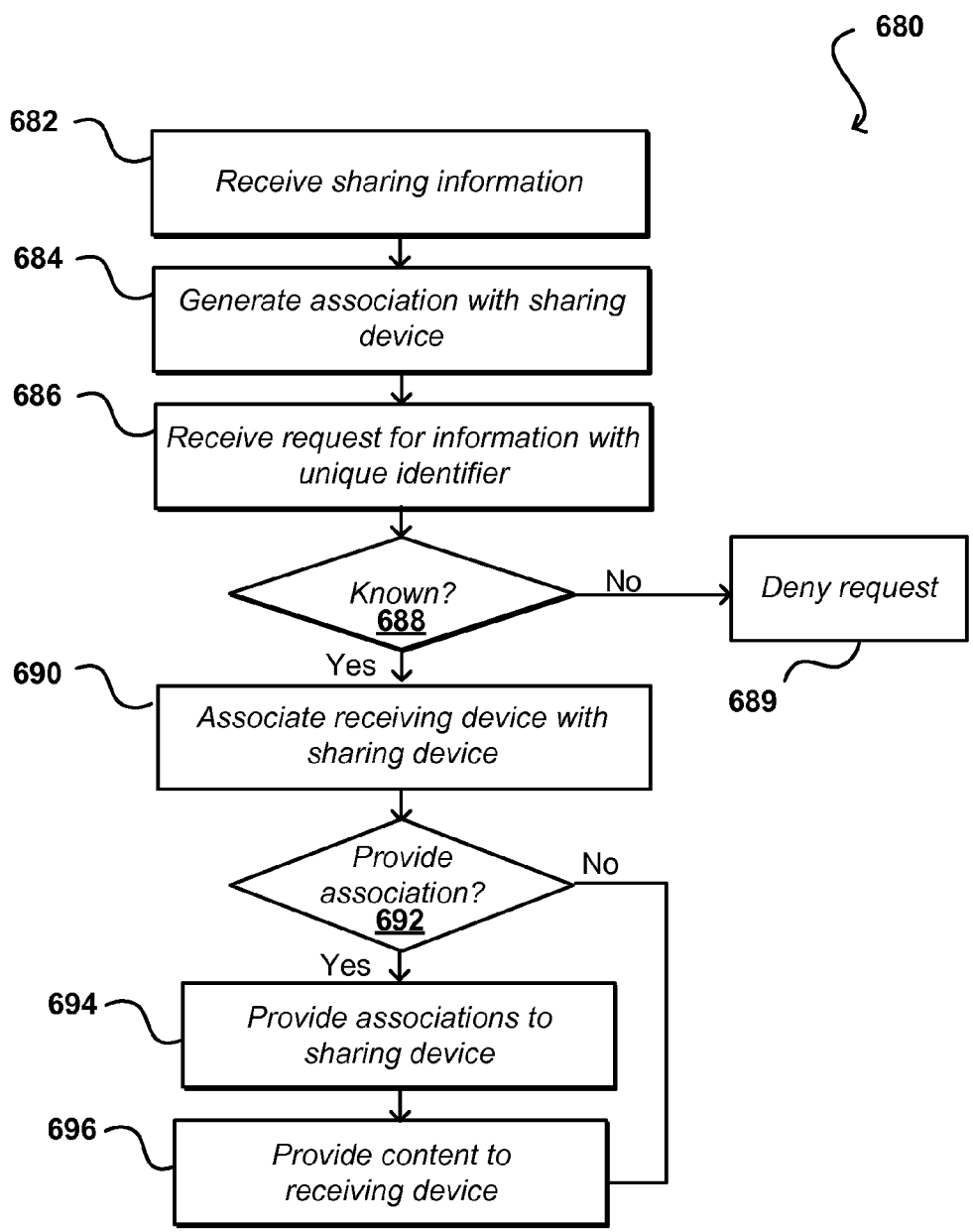

FIGS. 6(a)-6(c) illustrate additional methods for sharing content that can be used in accordance with various embodiments. FIG. 6(a) illustrates a process 600 by which a first user having a sharing device can share content with a second user having a receiving device. It should be understood, however, that such an approach can also allow a single user to share information between different devices, such as to transfer a file between devices. In this example, the sharing device receives a selection of content from the first user 602. As discussed, this can involve the user opening a document, browsing a Web page, selecting a search result, or otherwise designating specific content. The sharing device typically will present the content to the user 604, such as by rendering the page or document for display, playing the audio or video file, or performing a similar action. The sharing device then can receive a request from the first user to share the content 606. As discussed, this can involve the first user selecting an option or menu item on an interface of the sharing device to share the content with another user. For an audio device without a display screen, this can involve pushing a button when a desired song or audio file is to be shared.

In this example, the sharing device generates a unique identifier 607, such as a randomly generated number, and associates that identifier with the content to be shared. The unique identifier and an identification of the content to be shared, or the content itself, are then transmitted to a common network resource 608 accessible by all devices for which the content is to be shared. This information is collectively referred to herein as "sharing information." In addition to including the unique identifier and an identification of the content to be associated with the content information, additional information may be included in the sharing information. For example, the sharing information may include information about the sharing device, such as a unique identifier of the sharing device, an expiration time for the shared content (as described below), requirements for how the content is to be shared (e.g., on a page by page basis, or all at once), whether association information about receiving devices accessing the shared content is to be provided back to the sharing device, etc. The common network resource may include, for example, a content provider, a content repository, enterprise server for the devices (such as an office network location), etc.

In addition to providing sharing information to a common network resource, the sharing device also begins transmission of an information signal by transmitting a notification signal 609 to indicate to other capable devices within range that the sharing device is about to transmit an information signal. Transmission of a notification signal can include transmitting a specific tone or code, which when detected by a capable receiving device puts that device in ready state such that the receiving device can attempt to receive the information signal and determine whether it received the information signal without error. After a predetermined delay following the notification signal, the sharing device transmits the information signal 610. In this embodiment, the information signal is the unique identifier generated and associated with the content. The information signal may also include a pointer to or identification of the common network resource. In alternative embodiments, the common network resource may already be known to all devices and therefore no additional information need be included in the information signal.

Additionally, in some embodiments the sharing device can encode and/or encrypt the information signal before or during transmission. As part of the transmission sequence, or as part of the information signal, an error correction signal may be transmitted such that a receiving device can quickly determine whether the information was accurately received. In a similar manner, an authorization signal may also be transmitted thereby providing additional security to ensure that only authorized recipients receive the shared content.

In some embodiments, the information signal can be repeated a number of times, such as for a total of three transmissions. Such an approach can help to ensure that the receiving devices are able to receive the information signal without error. For example, if an audio signal is only transmitted once, any noise, such as someone coughing or moving a chair, could prevent the signal from being received properly. In addition to the sharing device retransmitting the signal, the information signal may include a repeater signal identifying to receiving devices that they should transmit the information signal; thereby increasing the likelihood that all intended devices are able to receive the information signal without error.

In some embodiments, the receiving devices are able to transmit an error tone or signal if the information signal is not properly received. The receiving device can know that the information signal was not properly received through a number of approaches, such as the error code not matching the information, an incomplete amount of data being received, or the receiving device being unable to locate content using the information obtained from the received information signal. The sharing device then can listen for a period of time to determine whether an error signal is received from one of the receiving devices 612. While each receiving device could also emit a tone or signal that the information signal was received successfully, in many situations the sharing device will not know how many receiving devices were supposed to receive the information. Thus, the sharing device would not know whether all receiving devices successfully received the information based only on receiving devices that successfully received the information transmitting a confirmation signal. If an error signal is received 614, then the sharing device can again transmit the information signal. If no error signals are received after a defined period of time following transmission, then the sharing device can assume that all appropriate receiving devices received the information and can end the transmission process 616.

FIG. 6(b) shows a corresponding process 650 that can be used with a second or receiving device in accordance with various embodiments. In this process, a user of the receiving device can activate a listen mode 652, such as by selecting an option through an interface or moving a switch on the receiving device. In an embodiment where encryption, security signals or authorization signals are used, the user might also have to enter, select, or otherwise activate a signal such that the receiving device only listens for specific information. The receiving device then can passively wait to receive a notification signal from another device and optionally confirm that it is an intended signal for that device (e.g., via the encryption, security signal or authorization signal). When the receiving device receives such a notification signal 654, and optionally confirms encryption, security signal or authorization signal, the receiving device can actively listen for a corresponding information signal 656. When listening for an information signal, the receiving device can analyze the sound input to attempt to determine the appropriate information signal 658, along with any encoding, error correction, or other information. The receiving device then can verify whether the information was properly received 660, such as by decoding the information and applying the error correction signal. If the information signal was not properly received 662, the receiving device can either wait for a retransmission of the information signal

663, or emit an error signal 668 thereby requesting that the information signal be retransmitted. The receiving device may determine to await retransmission 663 for a predetermined count or time-period. For example, if the receiving device has received less than three attempted transmissions of the information signal, it may wait for a predetermined time-period (e.g., 10 seconds) before sending an error signal 668. However, if the receiving device has already received three attempted retransmissions of the information signal, it may automatically send an error signal 668 again requesting the information signal. In some embodiments, a receiving device emitting an error signal can cause a device other than the sharing device to retransmit the information signal, such that devices at the edge of the signal range of the original sharing device can obtain the information from devices that are within range. Once the information is properly received and decoded, the receiving device sends a request to obtain the shared content, which includes the unique identifier, to the common network resource 664. In addition to sending the unique identifier, the receiving device may also send an identification of the sharing device. Security of information is increased through use of a unique identifier, optionally an identification of the sharing device, and a common network resource known only by devices for which content is to be shared. In particular, even if the information signal is intercepted or received by an unintended device, the unintended device cannot obtain the content without knowledge of the common network resource. In response to sending the unique identifier to the common network resource, the receiving device is provided with the content 665 or a link (e.g., a URL) to the content and presents the content to the second user via the receiving device 666.

FIG. 6(c) shows a corresponding process 680 that can be used by a common network resource to receive sharing information from a sharing device and provide shared content to receiving devices, in accordance with various embodiments. In this process, a common network resource receives sharing information 682 from a sharing device. In a general embodiment, this may be a pointer or URL to a specific item of content, for example. In alternative embodiments, such as the one described with respect to FIGS. 6(a) and 6(b), the sharing information may include a unique identifier, an identification of content that is associated with the unique identifier and an identification of the sharing device. Upon receiving sharing information, the common network resource generates an association with the unique identifier included in the sharing information, the identified content and the sharing device 684. This may include confirming that a copy of the content is maintained or accessible by the common network resource. In the event that the common network resource does not have a copy of the content to be shared, it may obtain that content from the sharing device or another location. In addition to generating an association between the unique identifier and the content, the sharing device may also be associated with the unique identifier.

In some embodiments, the sharing information may also include an expiration time. The expiration time informs the common network resource of the duration of time for which content is to be provided in response to a request to share content that utilizes the corresponding unique identifier. For example, if a speaker at a meeting only wants the referenced content to be shared for a duration of one day, the expiration time identifies that the content associated with the unique identifier is only to be shared for a duration of one day. In other embodiments, the common network resource may assign a default expiration time. Such a default time may be based on a pre-set time limit or may be dynamically generated. In the instance in which the expiration time is dynamically generated, many different techniques may be used. For example, the expiration time may be dynamically set based on a measured frequency with which requests to share the content are received. As the frequency of requests decreases, the expiration time may be set such that after a minimum frequency is reached the content is no longer available for sharing.

Another benefit of utilizing a common network resource is that the shared content can be accessed and made available to user devices even if the user is reviewing a reproduction of an event during which content was shared. For example, if content was shared during a meeting presentation and a user is viewing, or listening to, a recording of that presentation, the notification signal and subsequent information that are audibly generated during the original presentation will be reproduced by the recoding and the information provided to the user's device. The user's device, just as it would if participating live, would be able to provide to the common network resource the information necessary to obtain access to the shared content. As a result, the user of that device would be able to view that content on the device as the user is viewing the recorded presentation. Additionally, if the content is dynamic content, such as a stock quote, the material may be automatically updated such that the viewer of the recorded event is provided with a current version of the content.

In addition to receiving sharing information from a sharing device, the common network resource can also receive requests to access content 686 from receiving devices that include a unique identifier, such as those described in FIG. 6(b), an identification of the receiving device and optionally an identification of the sharing device. Upon receiving a request to access content, it is confirmed whether the unique identifier included in the request corresponds to a unique identifier maintained by the common network resource 688. In some embodiments, this confirmation may include confirming that the unique identifier is associated with the sharing device identified in the request to access content. If the unique identifier provided by the receiving device is either not known, or has not been used for a predetermined period of time, the request is denied 689. However, if the unique identifier is known and current, the receiving device is associated with the sharing device 690 and a determination is made as to whether that association is to be provided back to the sharing device 692.

Association between receiving devices and a sharing device may be maintained for a variety of reasons. For example, such associations may be maintained for security reasons to confirm the identity of those accessing the shared content, for identifying which users attended a meeting, and for providing additional information to the sharing device. Further illustrating one example, if content is shared during a meeting and the user of the sharing device subsequently needed to update or correct the content, the shared content could be easily updated on the common network resource and the common network resource would be able to provide the updated content to the appropriate receiving devices. In addition to providing updates to shared content, the associations may be used for other purposes. For example, if content is shared as part of a meeting and a follow-up meeting is to be scheduled, an associated device can simply select to share the meeting specifics. That information is provided to the common network resource and the common network resource automatically provides the information to associated devices. As discussed above, the associations maintained by the common network resource can also be used to provide control signals (e.g., next slide/page) to receiving devices that are accessing the shared content. In addition, association information may be used to gather usage or statistical information regarding topics of common interest or to provide targeted material to users of the devices based on the type of content being shared.

In addition to maintaining an association of the sharing devices accessing the content, a determination is made as to whether those associations are to be provided back to the device that initiated the sharing 692 and optionally to other devices. Such a decision may be based on user preferences of the receiving devices or may be a requirement to accessing the shared content (as specified by the sharing device). Providing association information back to the sharing device gives the user of that device additional information about the audience with which content is being shared. For example, if the user initiating the sharing of content is a class teacher, providing information back to the teacher's device, the sharing device, identifying receiving devices (or the users of those devices) that are requesting and accessing the shared content will identify to the teacher who is reading the materials or participating in class.

If it is determined that associations are to be provided back to the sharing device, the common network resource sends information regarding the receiving devices, information regarding users of those device, or both, to the sharing device 694. Association information regarding receiving devices may be pooled and all receiving devices identified to the sharing device after a predetermined time-period. Alternatively, association information may be provided by the common network resource to the sharing device each time that resource receives a request from another receiving device to access to the shared content. As providing the associations to the initiating device, or after a determination that such associations are not to be provided, the common network resource provides the shared content to the receiving device 696; or provides access to the shared content. This may be accomplished by the common network resource providing the receiving device with an actual copy of the content or a pointer, such as a URL, to a specific location of the content that is to be shared.

As part of the association information provided back to the device that initiated sharing, additional information regarding access to the shared content may also be provided. For example, if content is made available for access on a page-by-page basis, or a section-by-section basis, as a receiving device requests each section that information may be provided back to the sharing device. In this embodiment, an instructor is able to monitor students' progress though the shared content (e.g., a book) and determine which students are on schedule with the consumption of the content, which students are behind and may need additional assistance and which students are progressing ahead of schedule.

Figure 7A:
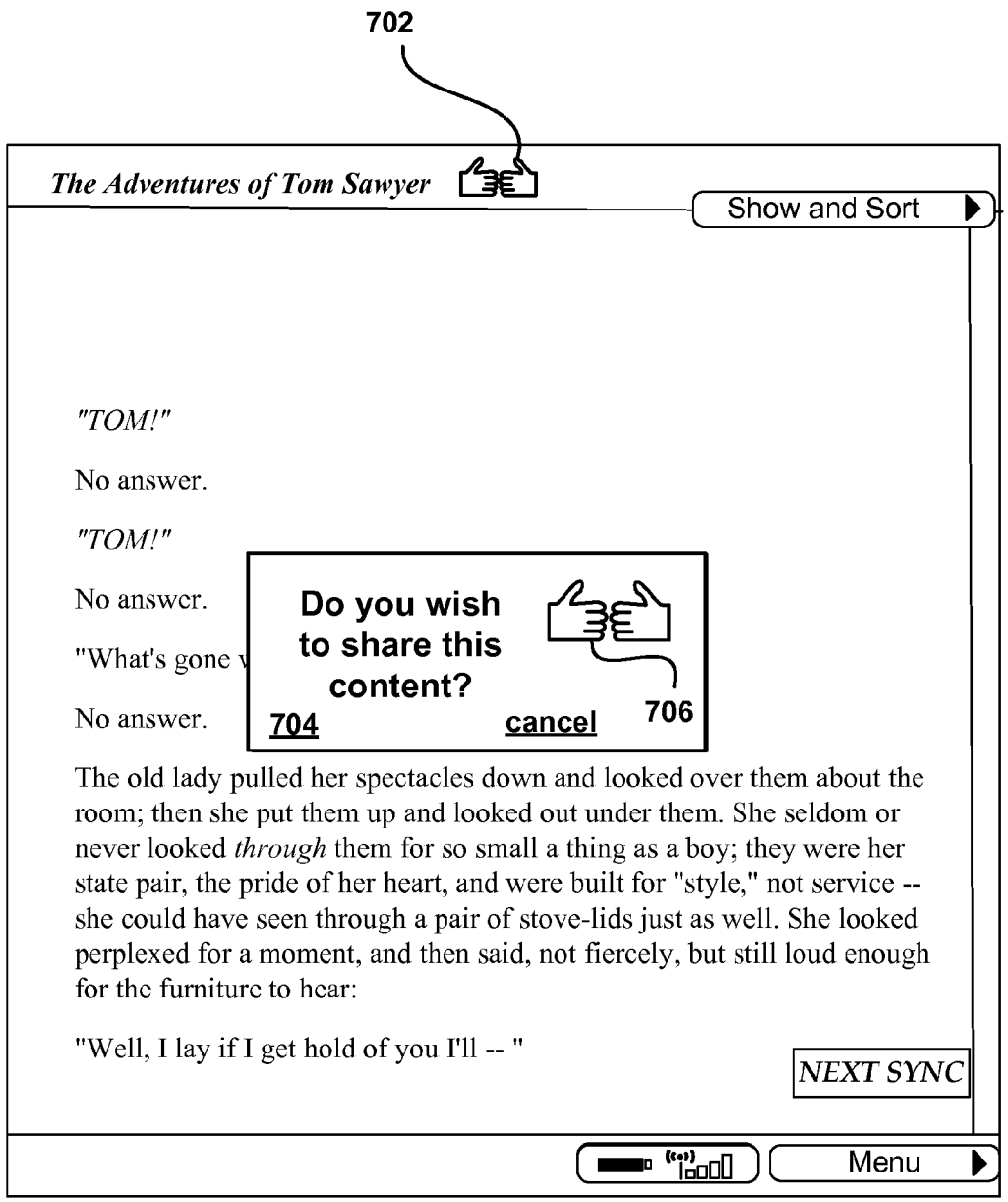
FIGS. 7(a)-7(b) illustrate examples of a display that can be generated to enable a user to share content in accordance with one embodiment.
Figure 7B:
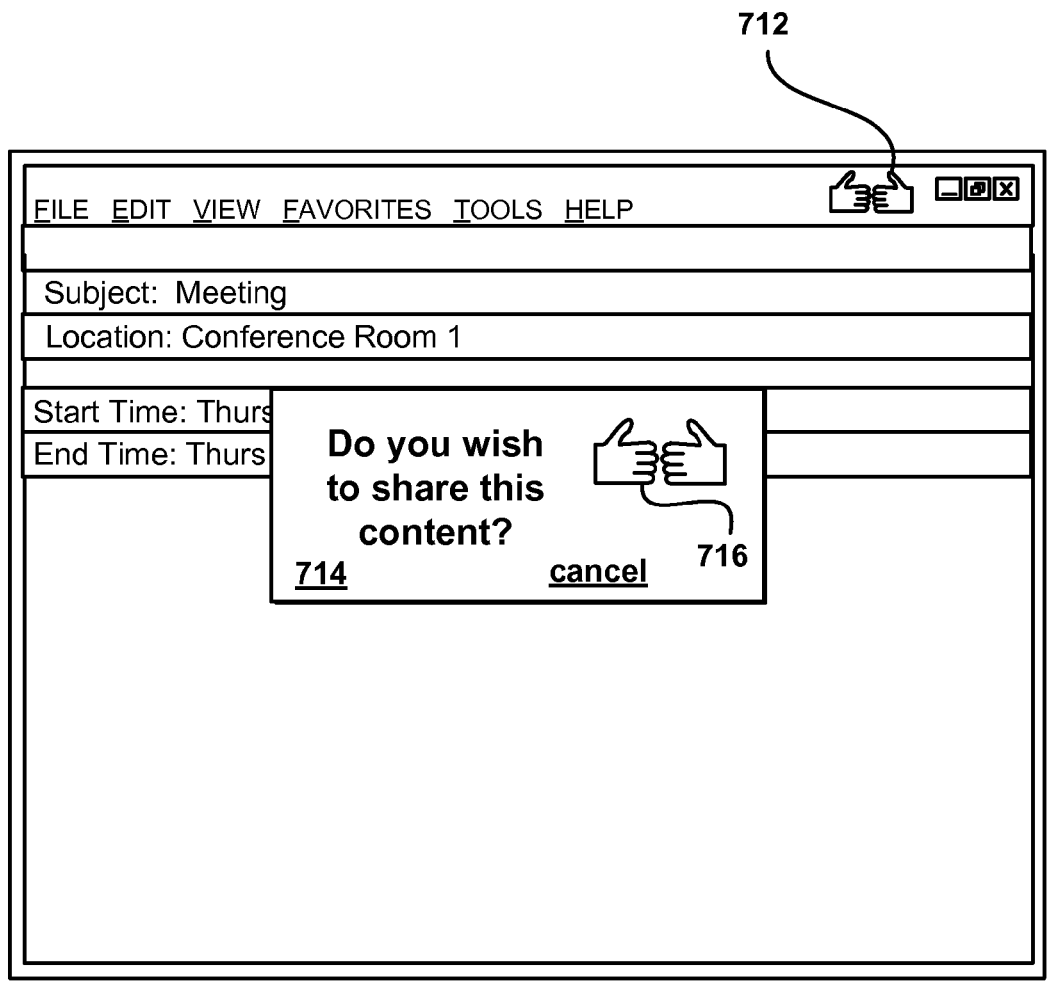

FIGS. 7(*a*)-7(*b*) illustrate example displays that can be presented to a user of a sharing device. In this example, a user is viewing a section of a book on an e-book reader. The user can indicate that the user wishes to share this page with others by selecting a "share" icon 702 or similar element on the display. Upon selecting the icon, a confirmation panel, modal window, or other such display 704 can be generated asking the user to confirm the instruction. In this example, the user can select a similar icon 706 on the confirmation panel to confirm that the user wants to share this content. In some embodiments, the device may not utilize a confirmation and may instead transmit an information signal based solely upon the user initially selecting to share the content.

Further, many other actions can be used to indicate that a document, or a portion thereof, is to be shared, such as by selecting an option from a menu or pressing a button on the device. For example, a user could access a menu item requesting to "share this document with those in this room" or "share this page with those in this room." In some embodiments, a user can select which type of signal (audio, infra-red, etc.) to generate based on the environment or other such factors. In some embodiments using audio-based signals, the signal generated is limited to the portion of the audio spectrum that is easily transmitted over phone lines, picked up by speakerphone microphones, and easily generated by speakerphone speakers.

In addition to sharing documents, as discussed above, embodiments described herein may be used to share any other type of content. For example, meeting requests may be easily shared with others. Referring to the example illustrated in FIG. 7(*b*), a user is viewing a calendar entry on a computing device. The user can indicate that the user wishes to share the calendar entry with others by selecting a "share" icon 712 on the display. Upon selecting the icon, a confirmation panel, modal window, or other such display 714 can be generated asking the user to confirm the instruction. In this example, the user can select a similar icon 716 on the confirmation panel to confirm that the user wants to share this content. In some embodiments, the device may not utilize a confirmation and instead transmit an information signal based solely upon the user initially selecting to share the content. Further, many other actions can be used to indicate that a calendar entry, or any other type of content, such as by selecting an option from a menu or pressing a button on the device. For example, a user could access a menu item requesting to "share this calendar entry with those in this room" or "share this meeting with those in this room."

Figure 8:
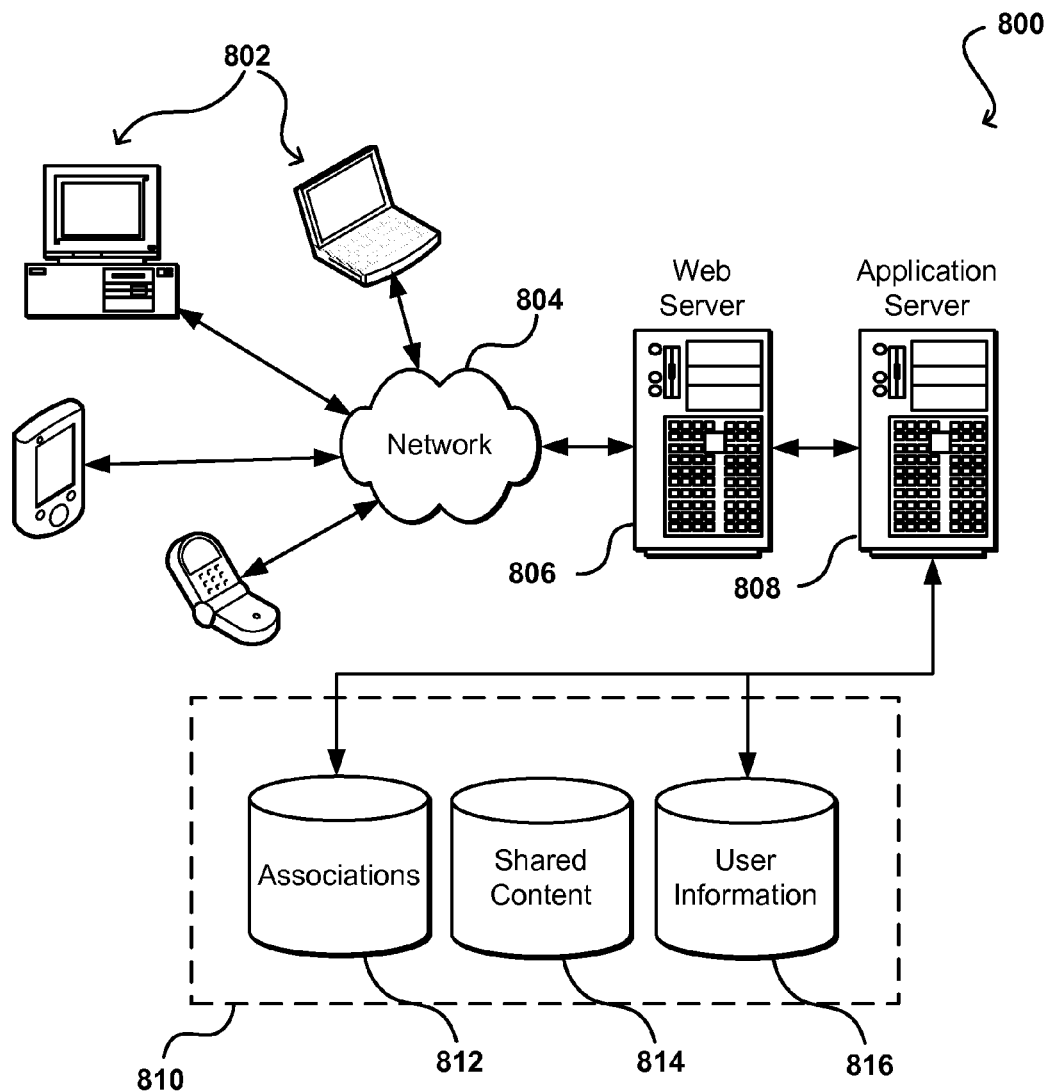
FIG. 8 illustrates an environment in which various embodiments can be implemented.

As discussed, various approaches can be implemented in various environments for various applications. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The environment 800 includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to obtain or provide content to client devices. The application server provides access control services in cooperation with the data store and is able to generate content such as text, graphics, audio, and/or video to be transferred or made available to the user, which may be served to the user by the Web server in the form of HTML, XML, or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases, or other data storage mechanisms and media for storing data relating to a particular aspect. For example, the data store illustrated includes mechanisms for storing associations 812 between sharing devices and receiving devices requesting access to shared content 814 and user information 816, which can be used to serve content for the production side. The data store also is shown to include a mechanism for storing shared content 814. It should be understood that there can be many other aspects that may need to be stored in the data store, such as control commands, progress information, etc.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices. User or client devices can include any of a number of general purpose personal computers, such as desktop or laptop computers running a standard operating system, as well as cellular, wireless, and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems, and other devices capable of communicating via a network.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information or shared content may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, by a first device from a second device that is remote to the first device, a first unique identifier associated with the second device;
   receiving, by the first device, a request to establish a first secure connection between the second device and a third device that is local to the second device;
   receiving, by the first device from the third device, first authentication information indicative of the third device receiving first sound waves corresponding to the first unique identifier;
   establishing, by the first device, the first secure connection based at least in part on the first authentication information;
   receiving, by the first device from the second device, a request to present content on an output device associated with the third device;
   sending, by the first device to the third device, first information for causing the third device to acquire the content for presentation via the output device;
   closing, by the first device, the first secure connection;
   receiving, by the first device from the second device, a second unique identifier associated with the second device;
   receiving, by the first device, a request to establish a second secure connection between the second device and a fourth device that is local to the second device;
   receiving, by the first device from the fourth device, second authentication information indicative of the fourth device receiving second sound waves corresponding to the second unique identifier; and
   establishing, by the first device, the second secure connection based at least in part on the second authentication information.

2. The computer-implemented method of claim 1, further comprising:
   determining that the first authentication information is received before an expiration time.

3. The computer-implemented method of claim 1, further comprising:
   sending a control signal to the third device, the control signal causing a different portion of the content to be presented on the output device.

4. The computer-implemented method of claim 1, further comprising:
   receiving user information indicative of at least one common interest between a first user associated with the second device and one or more second users; and
   sending targeted material to the third device based at least in part upon the at least one common interest.

5. A computing system, comprising:
   at least one processor;
   memory including instructions that, upon being executed by the at least one processor, cause the computing system to:
      receive, from a first device that is remote to the computing system, a first unique identifier associated with the first device;
      receive a request to establish a first secure connection between the first device and a second device that is local to the first device;
      receive, from the second device, first authentication information indicative of the second device receiving first sound waves corresponding to the first unique identifier;
      establish the first secure connection based at least in part on the first authentication information;
      receive, from the first device, a request to present content on an output device associated with the second device;
      send, to the second device, first information for causing the second device to acquire the content for presentation via the output device;
      close the first secure connection;
      receive, from the first device, a second unique identifier associated with the first device;
      receive a request to establish a second secure connection between the first device and a third device that is local to the first device;
      receive, from the third device, second authentication information indicative of the third device receiving second sound waves corresponding to the second unique identifier; and
      establish the second secure connection based at least in part on the second authentication information.

6. The computing system of claim 5, wherein the instructions, upon being executed by the at least one processor, further cause the computing system to:
   determine that the first authentication information is received before an expiration time.

7. The computing system of claim 5, wherein the instructions, upon being executed by the at least one processor, further cause the computing system to:
   receive a control signal to the second device, the control signal causing a different portion of the content to be presented on the output device.

8. The computing system of claim 5, wherein the instructions, upon being executed by the at least one processor, further cause the computing system to:

receive user information indicative of at least one common interest between a first user associated with the first device and one or more second users; and send targeted material to the second device based at least in part upon the at least one common interest.

9. A non-transitory computer-readable storage medium including instructions that, when executed by at least one processor of a computing system, cause the computing system to:

receive, from a first device that is remote to the computing system, a first unique identifier associated with the first device;

receive a request to establish a first secure connection between the first device and a second device that is local to the first device;

receive, from the second device, first authentication information indicative of the second device receiving first sound waves corresponding to the first unique identifier;

establish the first secure connection based at least in part on the first authentication information;

receive, from the first device, a request to present content on an output device associated with the second device;

send, to the second device, first information for causing the second device to acquire the content for presentation via the output device;

close the first secure connection;

receive, from the first device, a second unique identifier associated with the first device;

receive a request to establish a second secure connection between the first device and a third device that is local to the first device;

receive, from the third device, second authentication information indicative of the third device receiving second sound waves corresponding to the second unique identifier; and establish the second secure connection based at least in part on the second authentication information.

10. The non-transitory computer-readable storage medium of claim 9, wherein the instructions when executed further cause the computing system to:

determine that the first authentication information is received before an expiration time.

11. The non-transitory computer-readable storage medium of claim 9, wherein the instructions when executed further cause the computing system to:

receive user information indicative of at least one common interest between a first user associated with the first device and one or more second users; and send targeted material to the second device based at least in part upon the at least one common interest.

12. The computer-implemented method of claim 1, further comprising:

receiving, by the first device from the second device, the first information; and acquiring, by the first device from a remote server, the content for presentation via the output device based on the first information.

13. The computer-implemented method of claim 1, further comprising:

receiving, by the first device from the second device, the content for presentation via the output device based on the first information.

14. The computing system of claim 5, wherein the instructions, upon being executed by the at least one processor, further cause the computing system to:

receive, from the first device, the first information; and acquire, from a remote server, the content for presentation via the output device based on the first information.

* * * * *